Nov. 21, 1939.   O. M. ANDERSON   2,180,657
ELECTRIC RANGE
Filed Feb. 27, 1937   2 Sheets-Sheet 1
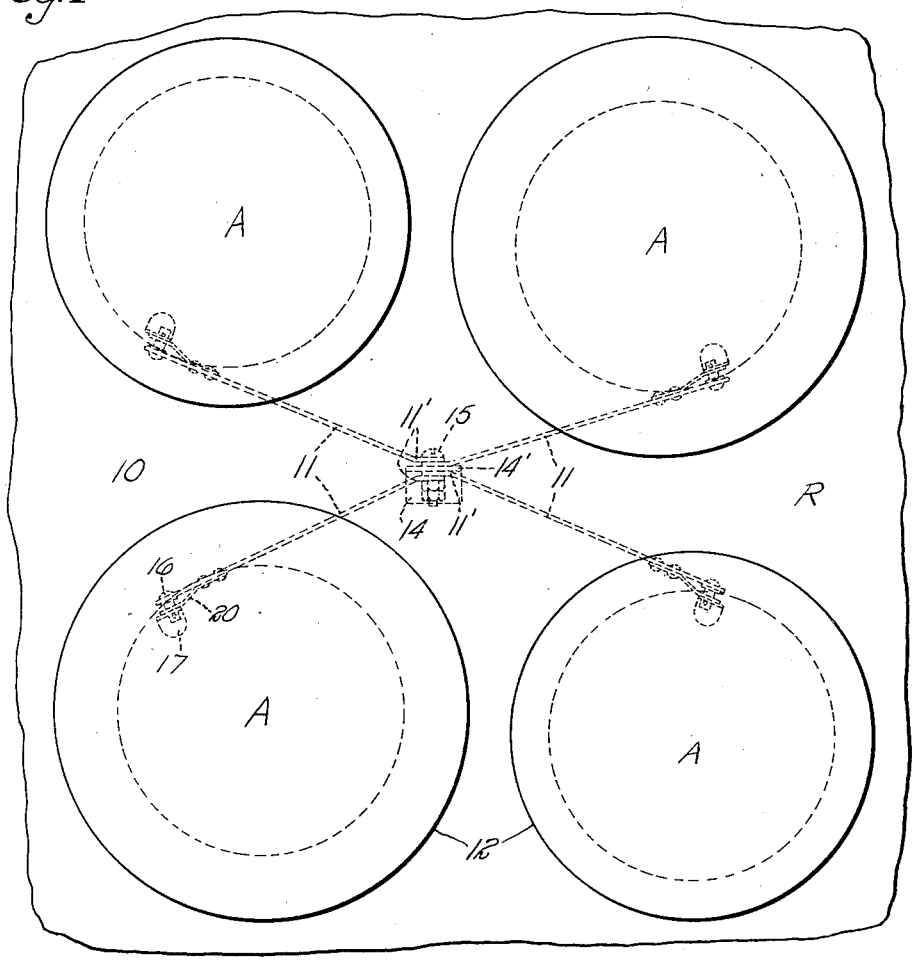
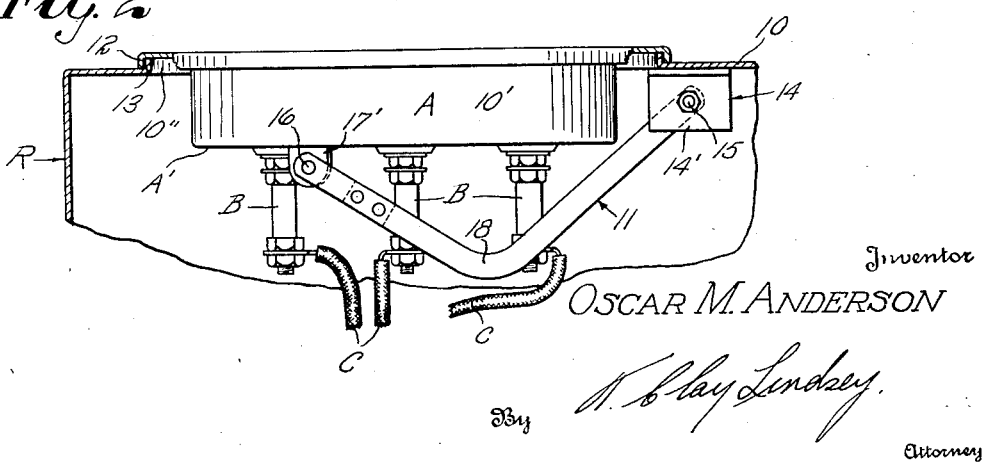
Inventor
OSCAR M. ANDERSON
By W. Clay Lindsey.
Attorney

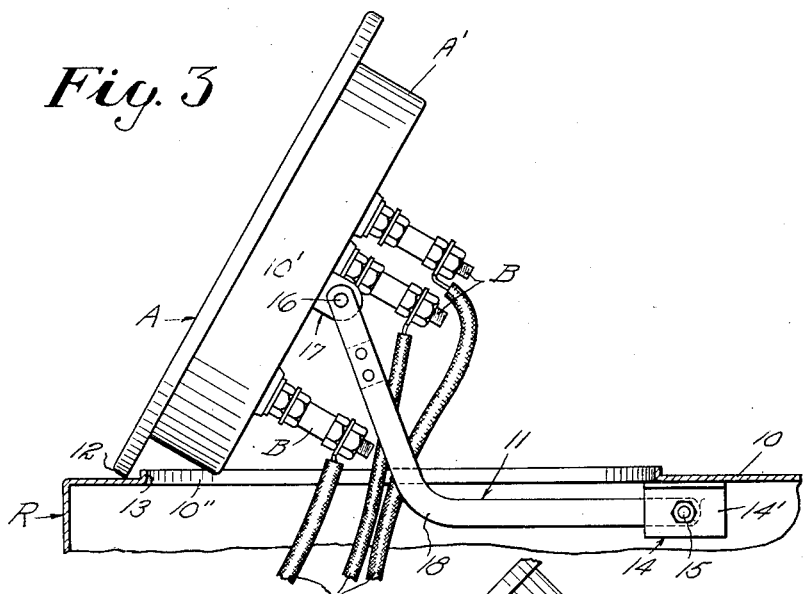
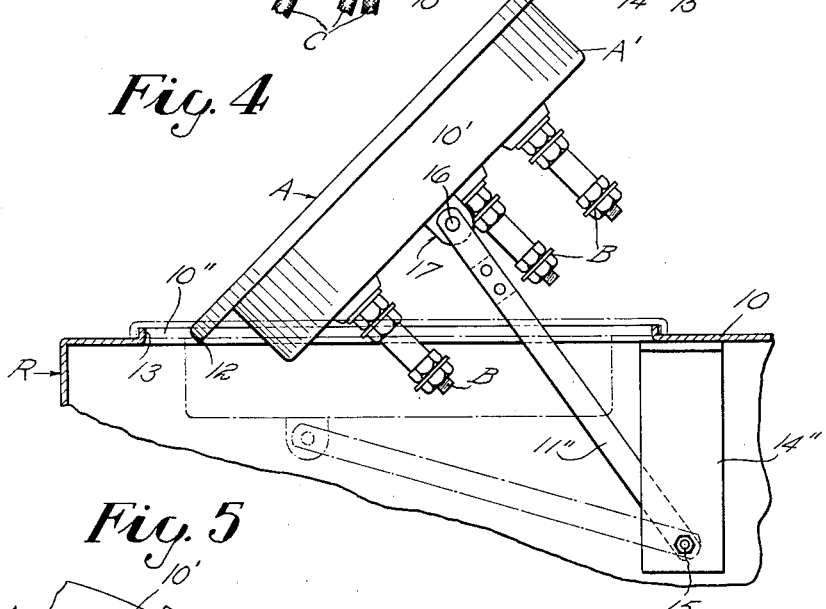
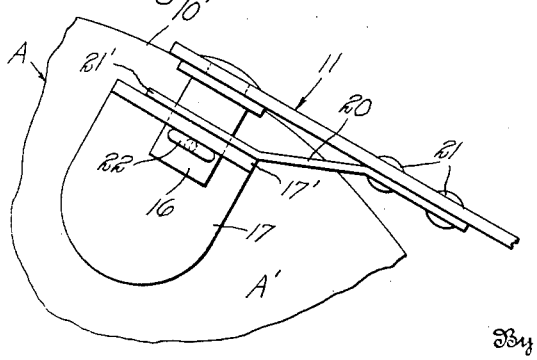

Patented Nov. 21, 1939

2,180,657

UNITED STATES PATENT OFFICE 2,180,657

ELECTRIC RANGE

Oscar M. Anderson, New Britain, Conn., assignor to Landers, Frary & Clark, New Britain, Conn., a corporation of Connecticut Application February 27, 1937, Serial No. 128,226

6 Claims. (Cl. 219—37)

This invention relates to improvements in electric ranges.

Heretofore, the top plates of electric ranges have been provided with apertures within which hot plates are removably supported. These hot plates have usually been free to turn in their supported positions, causing the electrical wires connected to the hot plate to become twisted, snarled, and broken, and frequently resulting in short circuits.

It is an aim of this invention to provide a link connection between a hot plate and a range which permits the hot plate to be easily tilted upwardly from the range to a position where the under side of the hot plate and that portion of the range normally supporting the hot plate are easily accessible for cleaning and the terminals and wiring connected to the hot plate are conveniently located for repair.

It is a further aim of this invention to provide a pivotal link connection between the hot plate and the top plate of a range supporting the hot plate and which prevents the hot plate from turning about its axis and snarling of the electrical wire connections to the hot plate.

It is a further object of my invention to provide a pivotal link connection between an electric hot plate and the top plate of a range removably supporting the hot plate and which provides a grounded electrical connection between the hot plate casing and the range at all times.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings illustrating one embodiment of my invention and wherein like parts are indicated by like numerals:

Figure 1 is a fragmentary plan view of the top of a range and showing several hot plates supported thereon and connected thereto by my invention;

Fig. 2 is a fragmentary vertical section through a range showing a single hot plate connected to a range with my invention;

Fig. 3 is a view similar to Fig. 2 but with the hot plate tilted upwardly into a position for cleaning and for getting at the electrical connections;

Fig. 4 shows a modified construction of the link between the hot plate and the range; and Fig. 5 is an enlarged plan view showing the pivotal grounding connection between one end of my link and the hot plate.

In accordance with this invention, one or more electric hot plates A are removably positioned within apertured portions of the top plate 10 of a range R. The under side of each hot plate is provided with a plurality of terminals B connected to a heating element within the metal casing A' of the hot plate and in an electrical circuit by wires C. A grounding link 11 pivotally connected at its respective ends to the metal casing A' and to the range, prevents turning of the hot plate with a consequent twisting and snarling of the wiring; permits the hot plate to be tilted upwardly and away from its normal operative position to get at the under side of the plate for cleaning or repair, and also provides an electrical grounded connection between the hot plate casing and the range at all times.

The hot plates which are illustrated as generally circular in contour, may be seated on the top plate 10 of the range in any convenient manner such as that disclosed in the patent to Lamb No. 1,537,030 issued May 5, 1925. In the present instance, the body portion 10' of metal casing A' depends through an aperture 10'' in the top plate, and a downwardly turned peripheral flange 12 on the casing overlies an upturned annular lip 13 at the edge of aperture 10'' to aid in locating the parts in position and prevent liquid spilled on the top plate from flowing through aperture 10'' into the range. A bracket 14 is rigidly secured to the under side of top plate 10, as by welding or other suitable means, to make a well grounded electrical connection therewith and has a depending arm 14' to which one end of link 11 is secured for a frictionally pivotal movement by a bolt 15 which may be prevented from loosening by suitable means, such as lock nuts.

As shown in Fig. 1, several hot plates (in the present instance, four) may be mounted on the top plate in grouped formation. In such a construction, it has been found convenient to locate bracket 14 generally centrally of the grouped hot plates and to bend the inner ends of each link, as at 11', and frictionally and pivotally connect these ends in position by a single bolt 15. The other or outer end of each link 11 is pivotally secured, as by a stud 16, to a bracket 17 rigidly fastened to and depending from the bottom of the hot plate casing.

My link 11 in the form illustrated in Figs. 2 and 3 is bent between its ends, as at 18, so that the inner ends of the link may be pivotally secured by bolt 15 relatively close to the under side of top plate 10, and the link will permit the hot plate to be tilted upwardly to a position wherein its under side and connections are easily accessible with the entire hot plate located above the top plate 10 (Fig. 3). In the modified construction of Fig. 4, link 11'' corresponds with link 11 and comprises a straight member pivotally secured at its opposite ends to respective brackets on the range and hot plate in the same manner as previously described. However, in this embodiment of Fig. 4, the depending arm of bracket 14" on the stove is considerably longer than arm 14' to permit proper link movement. It will be appreciated that in each of these constructions the link permits the movement of the hot plate so that it may be tilted upwardly to a position where the under side of the hot plate is easily accessible for cleaning and repair, and that portion of the top plate normally located beneath the hot plate is also uncovered for cleaning.

To maintain a well grounded but removable pivotal connection between each link and its hot plate casing, the stud 16 is rigidly secured at one end to the link, as by riveting, so that the stud laterally projects from the outer end of the link (Fig. 5), and a spring member 20 secured to the link frictionally engages against the depending portion 17' of bracket 17. This spring may be of various shapes and, as herein illustrated, comprises a flat spring member secured at one end to the link, as by rivets 21, and having an outwardly extending arm 21' spaced from the end of the link and freely receiving an intermediate portion of the stud and resiliently engaging bracket portion 17' to make positive electrical contact between the link and bracket. A cotter-pin 22 mounted in a hole through the stud engages the bracket portion 17' on the other side from that of spring arm 21' removably secures the stud in pivotal position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In an electric range, a top plate having an aperture, an electrical hot plate provided with a metal casing removably supported on the top plate and extending through said aperture, and a link having one end pivotally connected to the range and its free end movable through said aperture and connected to said casing and providing an electrical ground connection between the casing and range, said link preventing the hot plate from turning in the plane of the top plate and permitting the hot plate to be tilted upwardly from the top plate to facilitate cleaning of the top plate and providing accessibility to the under side of the hot plate.

2. In an electric range, a horizontally disposed top plate having an aperture provided with an upturned edge constituting an annular lip, a hot plate having a metal casing removably mounted within said aperture and provided with a peripheral flange extending over said lip to prevent liquids spilled on the range from flowing between said plates, a bracket rigidly secured to and depending from the under side of the top plate, a link having one end pivotally and frictionally secured to the bracket and a free end movable through said aperture, and means pivotally and frictionally securing the free end of said link to the hot plate casing and providing an electrical ground connection between the casing and range said means prevents the hot plate from turning in the plane of the top plate and permitting it to be bodily tilted upwardly and away from the top plate for access to the under side of the hot plate and that portion of the top plate normally located therebeneath.

3. In an electric range having an apertured top plate, a hot plate having a metal casing removably received within said aperture and provided with a peripheral flange supported on the top plate adjacent said aperture, a bracket rigidly secured to the under side of the top plate, a link having one end pivotally and frictionally secured to said bracket and a free end movable through said aperture, a second bracket rigidly secured to the under side of said casing, and means pivotally and frictionally connecting said second bracket to the free end of the link whereby the casing will be electrically grounded to the range through said link at all times and said link will prevent turning of the hot plate in the plane of the top plate and permit the hot plate to be tilted upwardly and away from the top plate to a position for cleaning.

4. In an electric range, a top plate having an aperture, an electrical hot plate having a metal casing received within said aperture and provided with a peripheral flange supported by the top plate adjacent said aperture, a bracket secured to and depending from the under side of the top plate, a link having one end pivotally and frictionally connected to said bracket and a free end movable through said aperture, a second bracket rigidly secured to and depending from the under side of said casing, a pivot pin laterally extending from the free end of the link and pivotally engaging said second bracket, and spring means rigidly secured at one end to the link and frictionally engaging said second bracket to provide an electrical connection between the hot plate casing and the link at all times.

5. In an electric range, a top plate having an aperture, an electrical hot plate having a metal casing received in said aperture, said casing being provided with a peripheral flange supported by the top plate adjacent the aperture, a bracket secured to the under side of the top plate, a link frictionally and pivotally secured at one end to said bracket and providing swinging movement for the free end of said link through the aperture, a second bracket secured to said casing on its underside, a pin rigidly secured at one end to the free end of said link and pivotally received within said second bracket, a spring rigidly secured at one end to the link and having an outwardly projecting arm freely receiving the pin intermediate of its ends and resiliently engaging said second bracket, and means removably securing said pin in pivotal position.

6. In an electric range, a horizontal top having an aperture therethrough, an electrical hot plate located in said aperture and supported by said top, said hot plate having a depending part provided with an aperture, a pivot member closely fitting said aperture, and a link having one end pivotally connected to the range and its opposite end connected to said pivot member to permit movement of said hot plate about a horizontal axis through the pivot member of said connection whereby said plate may be raised horizontally to clear said top and then tilted relatively thereto.

OSCAR M. ANDERSON.